(No Model.)
F. W. BAKER.
WATER FILTER.
No. 406,189. Patented July 2, 1889.
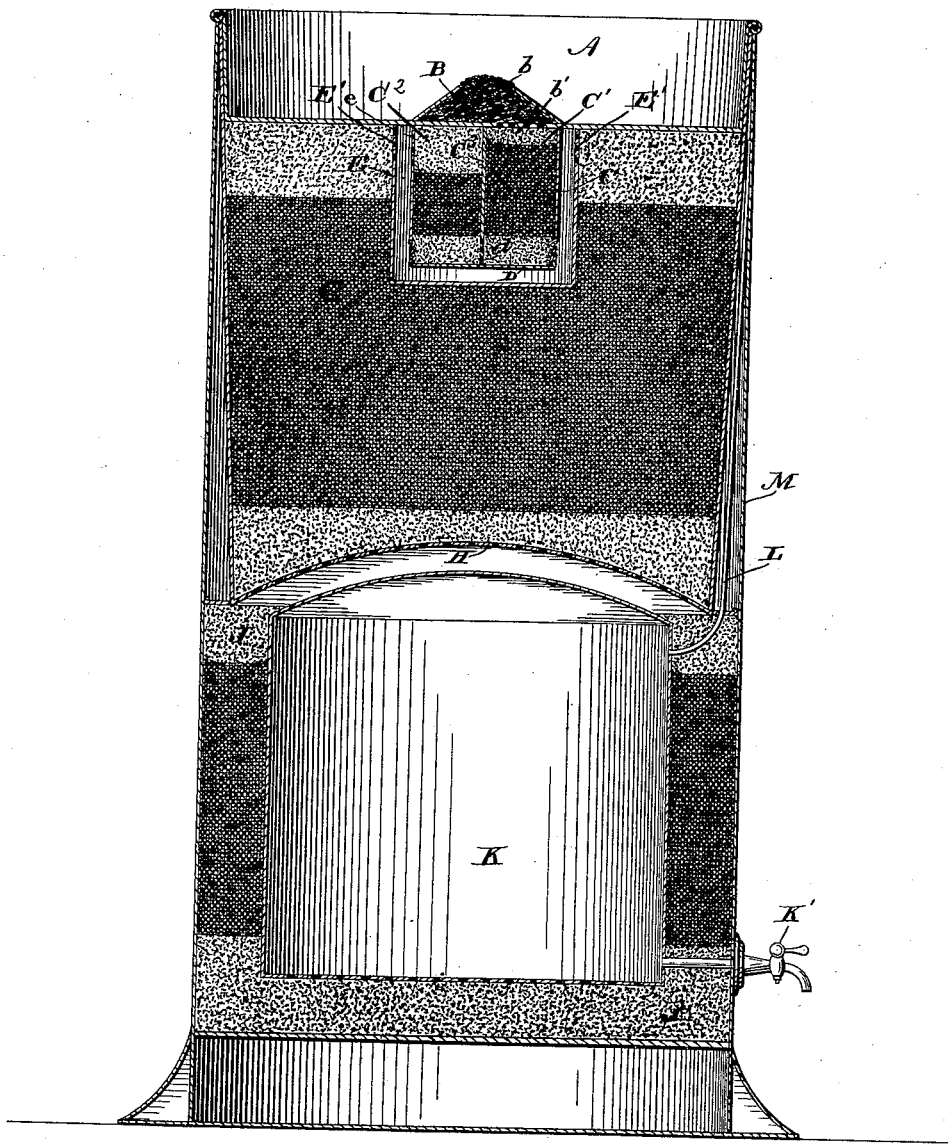
Witnesses.
Chas. R. Burr.
Thomas Durant
Inventor
F. W. Baker,
By Church & Church,
his Attorneys.

UNITED STATES PATENT OFFICE.

FRED W. BAKER, OF ROCHESTER, NEW YORK.

WATER-FILTER.

SPECIFICATION forming part of Letters Patent No. 406,189, dated July 2, 1889.

Application filed April 17, 1888. Serial No. 270,975. (No model.)

*To all whom it may concern:*

Be it known that I, FRED W. BAKER, of Rochester, in the county of Monroe and State of New York, have invented certain new and useful Improvements in Water-Filters; and I do hereby declare the following to be a full, clear, and exact description of the same, reference being had to the accompanying drawing, forming a part of this specification, and to the figures and letters of reference marked thereon.

My invention consists in certain novel features of construction, which will be first described, and then pointed out specifically in the claims at the end of this specification.

The accompanying drawing represents a longitudinal vertical section of a filter constructed in accordance with my invention.

Similar letters of reference in the several figures indicate the same parts.

The letter A indicates the receiver for water, constructed of sheet metal, and preferably of zinc. In the bottom of this receiver or pan is arranged a sponge-receptacle B, which is perforated at $b$ to permit the passage of water into it, and is filled with sponge, as shown.

Soldered or otherwise secured to the bottom of the receiver A is a receptacle C, which is divided vertically into two compartments $C'$ $C^2$ by a partition $C^3$, and has a removable screw-cap D for its bottom. Into each of these compartments is placed an upper and lower stratum of fine sea-gravel and an intermediate and much thicker stratum of charcoal, as shown. Communication is established between the sponge-receptacle B and the compartment $C'$ through perforations $b'$ and between the said compartment $C'$ and the compartment $C^2$ through perforations $d$ in the lower portion of the partition $C^3$. Perforations $e$ in the upper end of the compartment $C^2$ afford means of communication between said last-named compartment and a sediment well or receptacle E. This sediment-receptacle is provided with overflow-openings $E'$ near the upper end, which lead into the main filter G, consisting of a large receptacle containing an upper and lower stratum of gravel with intervening charcoal, as shown. The contents of the main filter G are supported upon a bottom H, which has perforations in it that open into a space communicating with the lower filter J, composed of layers of gravel and charcoal. This lower filter surrounds the sides and bottom of the water-reservoir K. The reservoir is provided with a cock or faucet $K'$ and with a vent-tube L, as shown.

When the water to be filtered is poured into the receiver A, it passes first through the sponge-receptacle B, where its grosser impurities are removed; thence down through the filtering material in the compartment $C'$ of the upper filter; thence through the perforations in the lower partition $C^3$; thence up through the filtering material in the compartment $C^2$; thence through the openings $e$ into the sediment-receptacle, where any sediment that has passed through the upper filter is allowed to settle; thence through the overflow $E'$ of the sediment-receptacle into the main filter G, down through the latter and its perforated bottom, and then through the lower filter J, and finally up into the reservoir K, through the perforated bottom of the latter, where it remains in a perfectly pure and clear condition, ready to be drawn off through cock $K'$ for use.

The sponge-receptacle is provided with an opening in its top to enable the sponge to be easily removed, cleaned, and replaced.

The upper and main filter can be both removed from the outer or main casing M when desired. The novel construction of the upper filter I deem of importance, since it is one that can be used separately or in connection with the other filtering devices shown, or still others not shown.

By removing the screw-cap bottom the receptacle C may be cleaned and repacked.

By preference I use zinc for the metal parts of my filter, though other suitable material may be used, if desired.

Having thus described my invention, what I claim as new is—

1. The combination, with the water-receiver A, of the sponge-receptacle B, the receptacle C, containing filtering material and divided into two compartments $C'$ $C^2$ by the perforated partition $C^3$, and having the discharge-openings $e$ in the upper part of the compartment $C^2$, and the sediment well or receptacle E, surrounding the two-part receptacle C and having overflow-openings near its upper end, substantially as described.

2. The receptacle C, containing the filtering material and divided into two compartments by the vertical perforated partition and having the removable imperforate cap constituting its bottom, substantially as described.

3. The receptacle C, containing the filtering material and divided into two compartments by the vertical perforated partition, and having the removable imperforate cap constituting its bottom, in combination with the sediment well or receptacle surrounding said receptacle C and having the overflow-openings near its upper end, substantially as described.

4. The combination, with the water-receptacle A, of the sponge-cup B, the receptacle C, containing filtering material and having the vertical perforated partition and the removable imperforate screw-cap for its bottom, the sediment well or receptacle surrounding said two-part receptacle and having the overflow-openings near its top, and the main filter, all constructed and arranged substantially as described.

FRED W. BAKER.

Witnesses:
MYRON T. BLY,
EARL B. PUTNAM.